US012526480B2

(12) United States Patent
Zwickson et al.

(10) Patent No.: US 12,526,480 B2
(45) Date of Patent: Jan. 13, 2026

(54) SYSTEMS AND METHODS FOR PROVIDING SCROLLABLE FEEDS MEDIA CONTENT

(71) Applicant: Spotify AB, Stockholm (SE)

(72) Inventors: Gustav Johan Rasmus Zwickson, Fairfield, CT (US); Jackson Deane, Bozeman, MT (US); Oluseye Ojumu, Brooklyn, NY (US); Eric Boam, Austin, TX (US); Emily Balbarin, Brooklyn, NY (US)

(73) Assignee: Spotify AB, Stockholm (SE)

( * ) Notice: Subject to any disclaimer, the term of this patent is extended or adjusted under 35 U.S.C. 154(b) by 110 days.

(21) Appl. No.: 18/349,091

(22) Filed: Jul. 7, 2023

(65) Prior Publication Data

US 2025/0016415 A1 Jan. 9, 2025

(51) Int. Cl.
*H04N 21/472* (2011.01)
*G06F 3/0482* (2013.01)
*G06F 3/0485* (2022.01)
*H04N 21/482* (2011.01)

(52) U.S. Cl.
CPC ......... *H04N 21/472* (2013.01); *G06F 3/0482* (2013.01); *G06F 3/0485* (2013.01); *H04N 21/4825* (2013.01)

(58) Field of Classification Search
CPC .............. H04N 21/472; H04N 21/4825; G06F 3/0482; G06F 3/0485
See application file for complete search history.

(56) References Cited

U.S. PATENT DOCUMENTS

| | | |
|---|---|---|
| 10,219,027 B1* | 2/2019 | O'Neill .............. H04N 21/4312 |
| 2012/0066592 A1 | 3/2012 | Issa et al. |
| 2017/0188102 A1* | 6/2017 | Zhang ................ H04N 21/4532 |
| 2019/0238787 A1 | 8/2019 | Lewis et al. |
| 2020/0285440 A1 | 9/2020 | Prindle et al. |
| 2020/0301965 A1* | 9/2020 | Cormican ............. G06F 16/735 |
| 2024/0251130 A1* | 7/2024 | Berezhnoy ......... H04N 21/4532 |

* cited by examiner

*Primary Examiner* — Joshua D Taylor
(74) *Attorney, Agent, or Firm* — Morgan, Lewis & Bockius LLP

(57) ABSTRACT

An electronic device provides, to a user, a user-curated playlist, the user-curated playlist including an ordered set of media items that were added by the user. While providing a first media item in the ordered set of media items, the electronic device receives a first user input selecting an option to include recommended media items in the user-curated playlist. In response to the first user input, the electronic device updates the user-curated playlist to include a first recommended media item, the first recommended media item selected without user intervention based at least in part on attributes of the user-curated playlist. The first recommended media item is positioned in the user-curated playlist in between media items that were added to the ordered set of media items by the user.

20 Claims, 15 Drawing Sheets

500

502 Present, via a first user interface of a media-providing service, a scrollable feed of content items.

504 The scrollable feed includes one or more representations of audio content items

506 The scrollable feed includes one or more video content items associated with particular audio content items

508 The scrollable feed includes a composite content item, the composite content item including a plurality of video content items and/or representations of audio content items that are associated with a particular content item.

510 The scrollable feed of media items is a first scrollable feed, and the video content items and the representations of audio content items within the first scrollable feed are associated with media items having a first media content type.

512 Receive an implicit or explicit user selection of a respective video content item associated with a respective audio content item.

514 In response to the implicit or explicit user selection of the video content item associated with the respective audio content item, playing back the respective audio content item associated with the video content item.

516 In response to the implicit or explicit user selection of the respective video content item associated with the respective audio content item, transition to a second user interface associated with playback of particular media items.

532 In accordance with determining that the second user input is directed to a first affordance corresponding to the respective media item, initiate playback of the predefined sequence from the respective media item.

---

534 In accordance with determining that the second user input is directed to a second affordance corresponding to the predefined sequence, performing an alternate operation related to the predefined sequence, distinct from initiating playback of the predefined sequence from the respective media item.

---

536 In accordance with a first determination that the second user input is directed to the first affordance corresponding to the respective media item, provide first feedback to a media content server corresponding to the respective media item.

---

538 In accordance with a second determination that the second user input is directed to the second affordance corresponding to the predefined sequence, provide second feedback to the media-content server corresponding to the predefined sequence.

---

540 In accordance with detecting a third user input directed to an affordance within the first user interface, present a second scrollable feed that includes video and content items associated media items having a second media content type.

---

542 In accordance with detecting a fourth user input directed to a first respective content item within the first scrollable feed, perform a first operation with respect to the first respective content item within the first scrollable feed.

---

544 In accordance with detecting a fifth user input directed to a second respective content item within the second scrollable feed, perform a second operation, different from the first operation, with respect to the second respective content item within the second scrollable feed.

FIG. 5C

SYSTEMS AND METHODS FOR PROVIDING SCROLLABLE FEEDS MEDIA CONTENT

TECHNICAL FIELD

The disclosed embodiments relate generally to media provider systems, and, in particular, to presenting scrollable feeds of media content items for playback at electronic devices.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, media content providers provide recommendations to help users discover media content, improving the convenience with which users can digest and experience such content.

SUMMARY

In the modern digital age, where users have access to an overwhelming amount of media content they can potentially consume, there is a need for improved systems and methods for discovering new media content while minimizing the consumption of undesirable content or content that may not suit a user's specific tastes at a given time, despite being recommended to the user based on their listening preferences.

In the disclosed embodiments, systems and methods are provided for presenting scrollable feeds of content items (e.g., scrollable feeds that only include representations of audio content items; scrollable feeds that only include video content items, and scrollable feeds that include combinations of representations of audio content items and video content items). In some embodiments, a scrollable feed includes representations of audio content items (e.g., song tracks) and video content items associated with particular audio content items (e.g., short videos associated with tracks). In some circumstances, the representations of the audio content items and the video content items associated with the particular audio content items may provide previews of the audio content items (e.g., portions of songs, portions or selected highlight clips of podcasts, and/or memorable selections or quotes from audiobooks). The user can select a video content item to cause a media content item associated with the video content item to be played in its entirety (e.g., within a so-called "now-playing user interface"; which reflects a currently-playing track in a listening session, as opposed to a preview). Recommendations provided to the user, either via content items in the scrollable feed (e.g., as part of a composite content item) or full media items, are based at least in part on the user's interactions with content items in the scrollable feed (e.g., previews) and full media items. The scrollable feed may also present composite content items, which include a plurality of audio and video content items that are configured to be presented in sequence (e.g., in a predefined order). For example, a composite content item may include beginnings of several chapters of an audiobook, selected cut points of a podcast, and/or popular songs from an artist's new album). The user can select affordances to switch between different scrollable feeds associated with different media-content types.

To that end, in accordance with some embodiments, a method is provided. The method includes presenting, via a first user interface of a media-providing service, a scrollable feed of content items, including one or more representations of audio content items and one or more video content items associated with particular audio content items. The method includes receiving an implicit or explicit user selection of a video content item (or a representation of an audio content item) of the one or more video content items and/or representations of audio content items associated with the particular audio content items. And the method includes, in response to the implicit or explicit user selection of the video content item associated with the respective audio content item, playing back the respective audio content item associated with the video content item.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for presenting scrollable feeds of media content items for playback at electronic devices.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating a method of presenting user interfaces of a media-providing service, including user interfaces that include one or more scrollable feeds of content items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
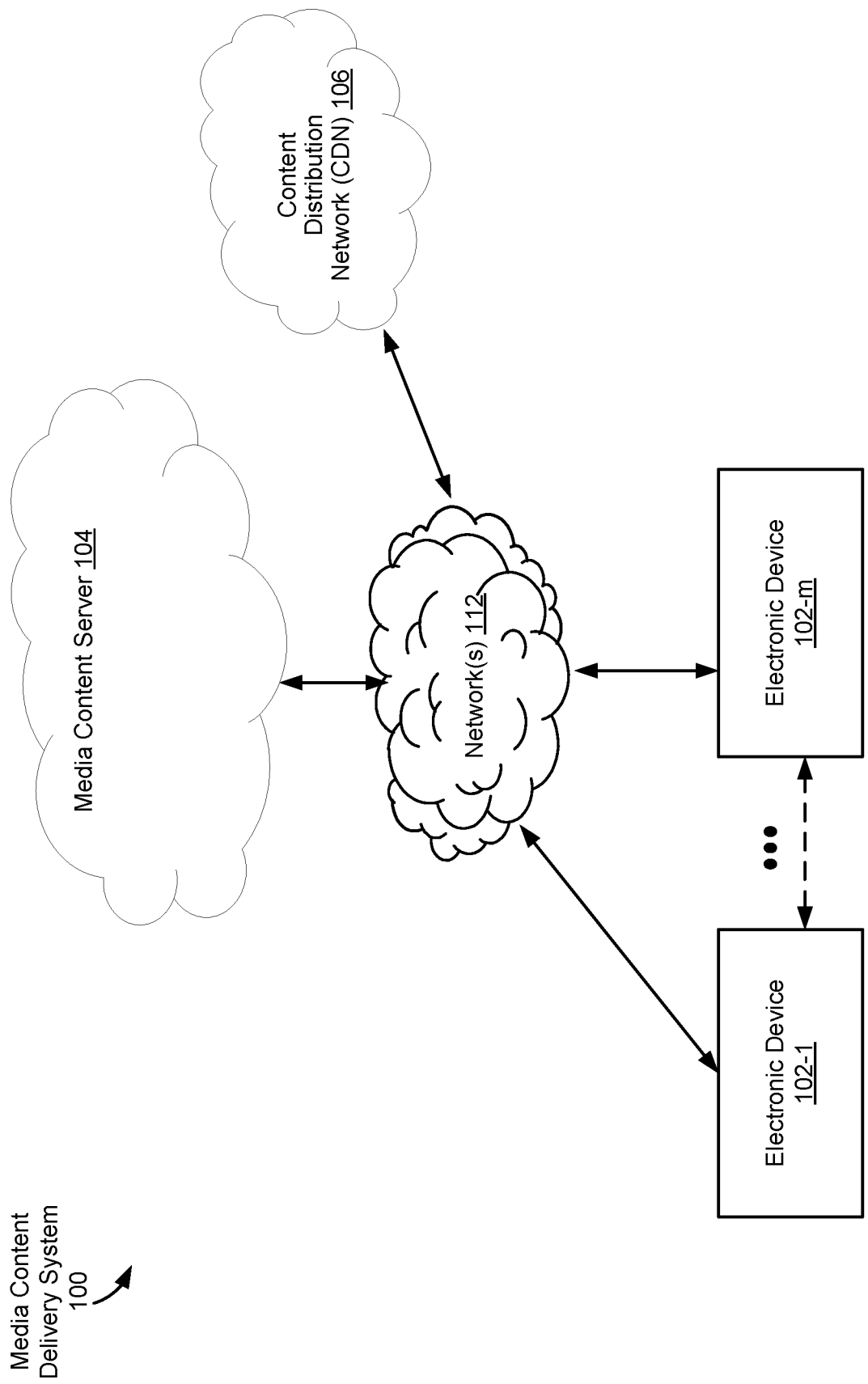
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more distinct types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-$m$ include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
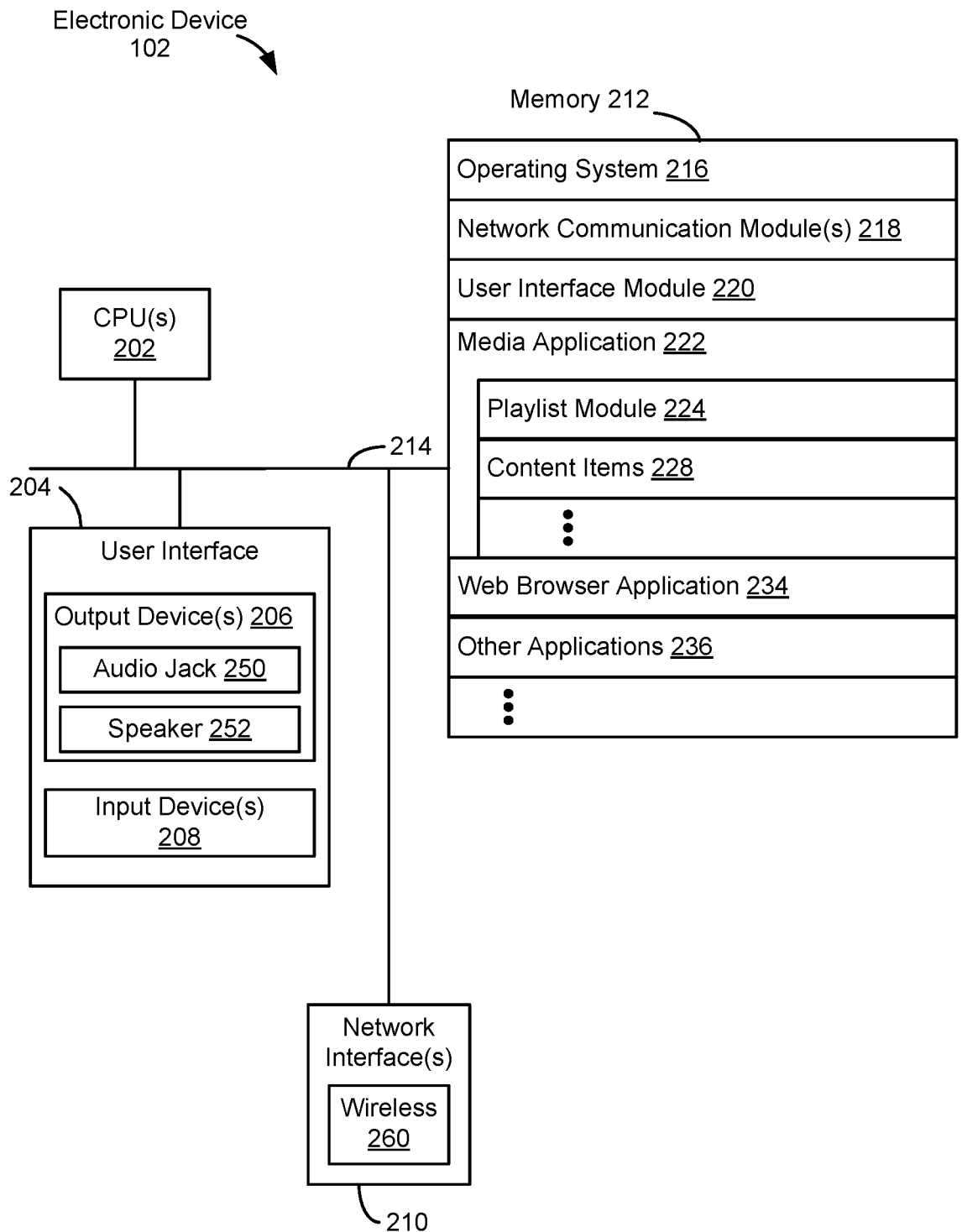
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

- a playlist module 224 for storing sets of media items for playback in a predefined order, the media items selected by the user (e.g., for a user-curated playlist) and/or the media items curated without user input (e.g., by the media content provider);
- a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
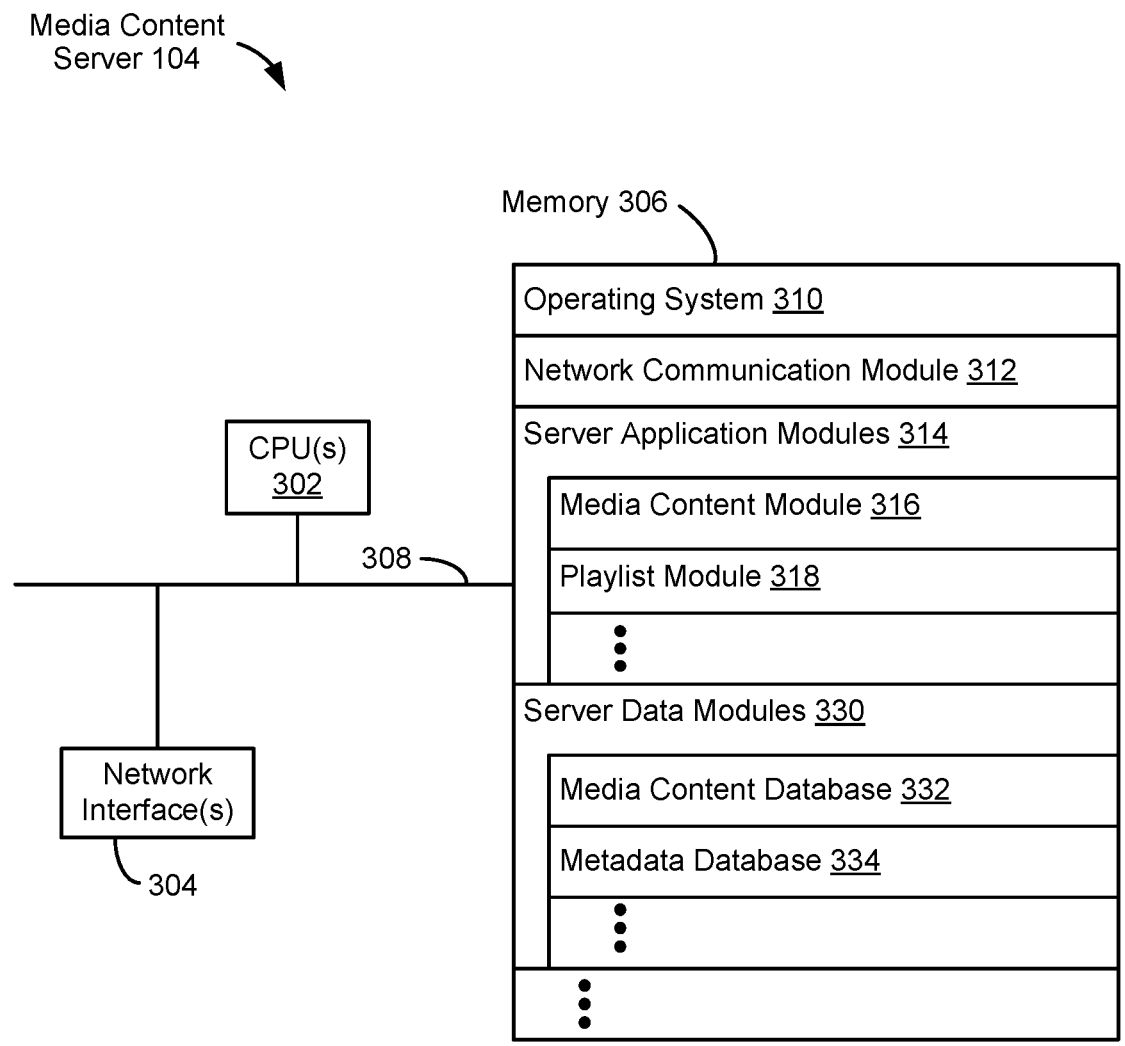
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - a playlist module 318 for storing and/or providing (e.g., streaming) sets of media content items to the electronic device;
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

FIGS. 4A-4I are block diagrams illustrating user interfaces of a media-providing service, including user interfaces that include one or more scrollable feeds of content items (e.g., displayed at the electronic device 102-1), in accordance with some embodiments. In some circumstances, the user interfaces shown in FIGS. 4A-4I can be used to browse content that the user may potentially want to watch, listen to, and/or otherwise consume. As such, in some embodiments, previews of media content items (e.g., partial or incomplete versions of media content items) are provided in in conjunction with the scrollable representations of said media items, as described below. Moreover, in some circumstances, the user is enabled to browse content (e.g., via the user interfaces shown in FIGS. 4A-4I) without interrupting the user's current listening session. To that end, in some embodiments, a currently-playing (e.g., a "now-playing") media item is maintained as the currently-playing media item in the listening session while the user browses the user interfaces shown in FIG. 4A-4I. Certain user inputs, as described below, cause a different media item, which is presented and/or previewed in the user interfaces in FIGS. 4A-4I, to replace the currently-playing media item in the listening session. Thus, the user interfaces shown in FIGS. 4A-4I allow users to browse with their eyes and/or their ears, through a scrollable feed of content items (e.g., previews of media items), without ending a current listening session.

Other aspects of the user interfaces described herein that include the scrollable feeds may be different based on whether there is a currently-playing media item in the listening session when the user initiates the scrollable feed. For example, to avoid interrupting a user's experience, audio content that would otherwise be played when the user initiates the scrollable feed may be muted based on a determination that there is a currently-playing media item in the user's listening session, providing a more efficient and intuitive browsing experience for the user that allows them to continue listening to the currently-playing media item while interacting with (e.g., browsing for) other content items. As another example, described in more detail below, a user interface element for muting and unmuting audio content, when selected while there is a currently-playing media content item in the listening session, may cause playback of the currently-playing media content item to be paused while audio content is being provided via the scrollable feed (e.g., without the audio content from the scrollable feed replacing the currently-playing media item for the listening session). In other words, various aspects of the scrollable feed may be adapted to be used in conjunction (e.g., simultaneously, concurrently) with currently-playing media content items being played in the listening session. In some embodiments, the electronic device causes an indication of the currently-playing media item to be stored (e.g., locally and/or at the media content server 104), such that playback of the media item can be resumed (e.g., when the user transitions back to the now-playing user interface or mutes content in the scrollable feed) at a later time after the media item has been interrupted based on the user's interactions with one or more content items in one or more scrollable feeds of media items.

Figure 4A:
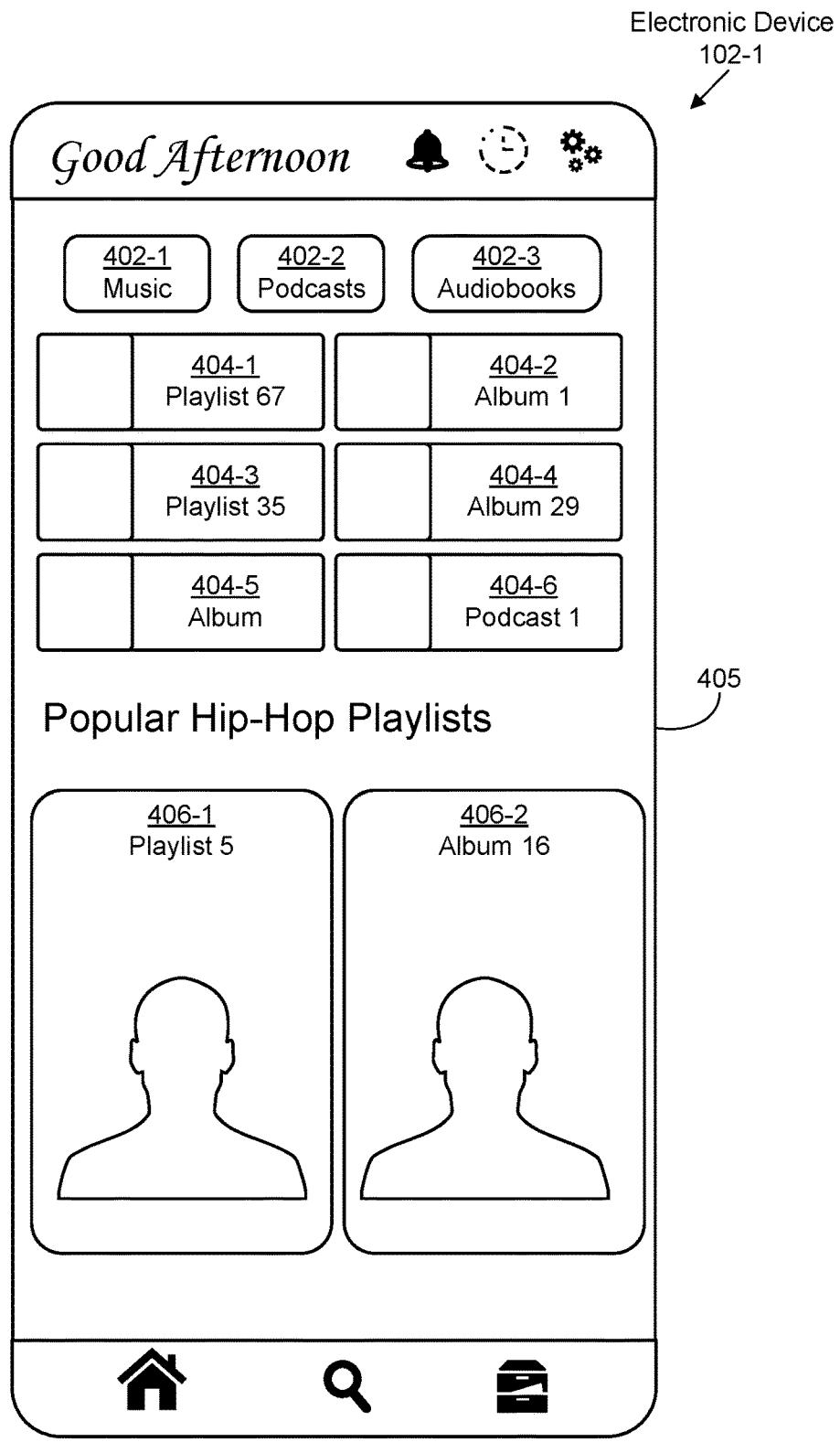
FIGS. 4A-4I are block diagrams illustrating user interfaces of a media-providing service, including user interfaces that include one or more scrollable feeds of content items, in accordance with some embodiments.

FIG. 4A illustrates a user interface 405 (e.g., a home user interface) of an application associated with a media-providing service. The user interface 405 includes user interface elements 402-1, 402-2, and 402-3, which each may be selected via respective user inputs. When selected via a user input, the electronic device 102-1 presents (e.g., by transitioning to another user interface from the user interface 405) a respective scrollable feed of media items (e.g., of respective media-item types, such as music, podcasts, and audiobooks) corresponding to the selected user interface element. In some embodiments, a particular scrollable feed can include a combination of content items associated with two or more of songs, podcasts, or audiobooks. In some embodiments, a particular scrollable feed can include content items that are different than songs, podcasts, or audiobooks (e.g., advertisements, or short artist- or creator-generated videos).

The user interface 405 includes multiple user interface elements, such as 404-1 and 404-2, and 406-1 to 406-8, which each represent particular content items (e.g., playlists, albums, songs, podcasts, and the like). In some embodiments, one or more user interface elements visually similar to the user interface elements 404-1 and 404-2 and/or the user interface elements 406-1 to 406-8 may be presented within any of the scrollable feeds, in conjunction with the respective video content items and/or representations of audio content items (e.g., composite content items) describe below. While a media content item is being played as part of operations of the application associated with the media-providing service, a playback indicator, such as an indicator 430 described below, may be presented within the user interface 405, in accordance with some embodiments.

Figure 4B:
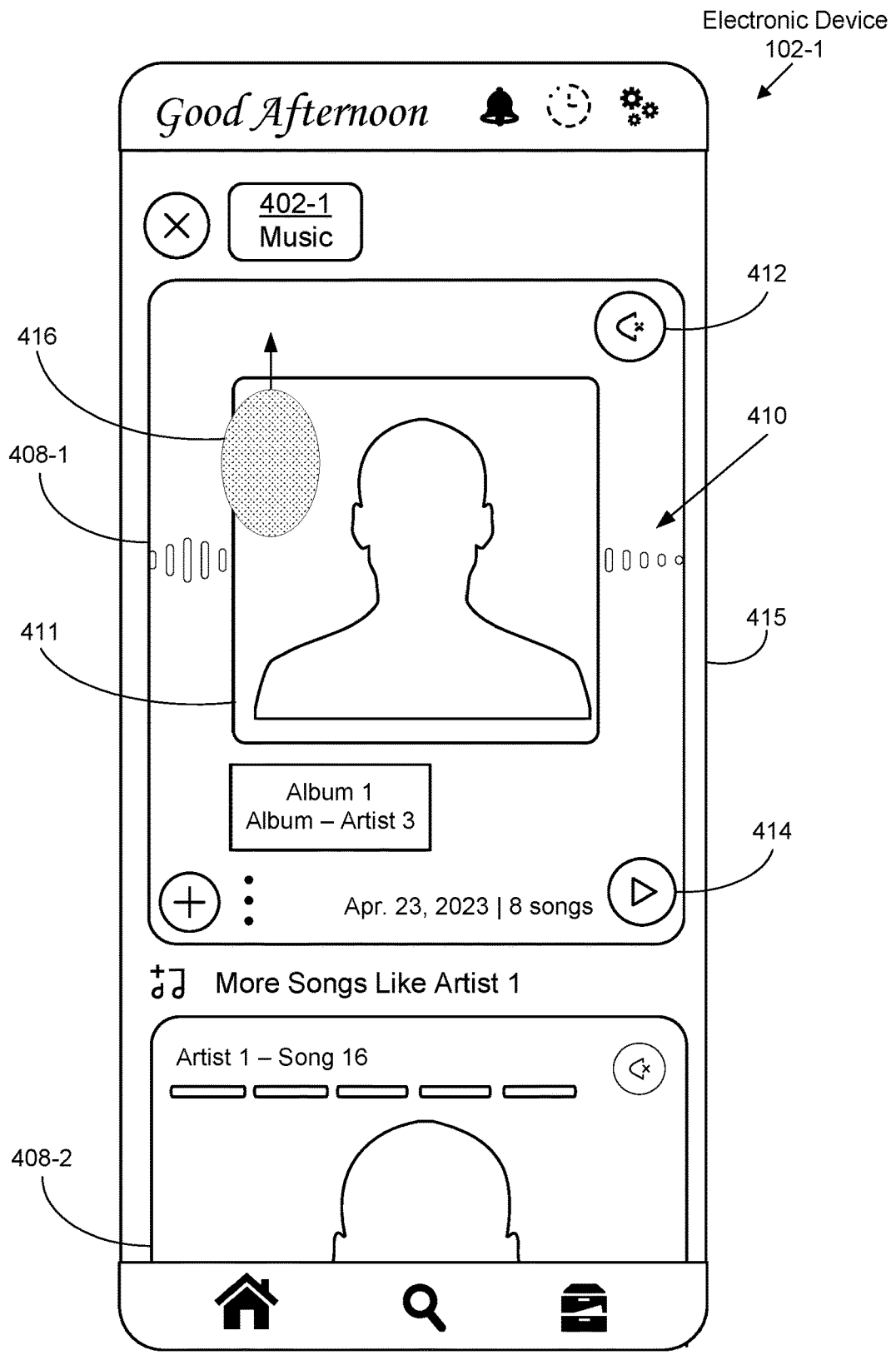

FIG. 4B illustrates a user interface 415 (e.g., a scrollable feed user interface), different than the user interface 405 shown in FIG. 4A. The user interface 415 includes a scrollable feed of content items (e.g., representations of audio content items, and video content items), which is being presented while there are no currently-playing media items being played back in the listening session. In some embodiments, the scrollable feed of content items includes a plurality of video content items, a plurality of representations of audio content items, and/or a combination of video content items and audio content items. For example, a user interface element 408-1 that is in focus within the user interface 415 includes a representation of a particular content item (e.g., an album, a podcast, a book series, or any other type of suitable content item) that includes a plurality of media content items that are configured to be played in a predefined order (e.g., a predefined sequence of media items composed by a producer). A user interface element 408-2 is partially visible below the user interface element 408-1 that is in focus. In some embodiments, video and/or audio content associated with an in-focus user interface element within the scrollable feed (e.g., the user interface element 408-1) begins to play automatically when the user accesses the scrollable feed (e.g., by accessing the user interface 415). In some embodiments, audio content of an in-focus user interface element is automatically muted if (e.g., in accordance with a determination that) there is a currently-playing media item in the listening session when the user interface element becomes in focus.

The user interface element 408-1 (e.g., a representation of an audio content item) includes dynamic sound bars 410 that are animating behind a cover art element 411 that is displayed near the center of the user interface element 408-1. In some embodiments, when the user interface element 408-1 becomes in focus within the scrollable feed user interface (e.g., the only user interface element within the scrollable feed that is entirely visible) the cover art element 411 shrinks (e.g., from a first size of the cover art element as is partially shown in the user interface element 408-2 below the user interface element 408-1), and the dynamic sound bars 410 appear as the media content item represented by the user interface element 408-1 begins to play at the electronic device 102-1. In some embodiments, a particular content item becoming in focus can cause other visual effects to the modify the cover art. For example, in accordance with a video content item coming into focus, the cover art can cease to be presented, and/or be presented as an icon in a corner of the content item so as not to obstruct the video content. In some embodiments, alternatively or additionally to the cover art element 411 shrinking when the user interface element 408-1 comes into focus, video content begins playing within the user interface element 408-1. In some embodiments, while (e.g., in accordance with a determination that) there is a currently-playing media item in the listening session, visual aspects of the video content are automatically played while audio aspects of the video content are initially muted by default.

The user interface 415 includes multiple affordances for interacting with the scrollable feed, including affordances within the user interface element 408-1 for interacting with the particular content item associated with the user interface element 408-1. For example, the user interface element 408-1 includes an affordance 412 for muting/unmuting audio content in conjunction with presenting the content item associated with the user interface element 408-1, and an affordance 414 for causing playback of a media content item of the particular content item associated with the user interface element 408-1 (e.g., playback of an entire version of the media content item, as opposed to a preview). Note that, in some embodiments, selection of the affordance 414 (or any other express or implicit user request to play back the entire version of the media content item) causes the media content item to replace the currently-playing media content item for the listening session. Other inputs, generally directed to browsing through the user interfaces shown in FIGS. 4A-4I, may cause various video and/or audio previews of media content items to be provided, but do not cause the currently-playing content item for the listening session to be replaced. As will be discussed below, user interface elements presented within the scrollable feed can include additional and/or alternative affordances, and the affordances 412 and 414 can cause additional or alternative operations to those described with respect to the user interface element 408-1.

FIG. 4B further illustrates swipe input 416 within the user interface 415, causing the user interface elements 408-1 and 408-2 to concurrently move upward within the user interface such that the user interface element 408-2 becomes in focus within the scrollable feed, as described below with respect to FIG. 4C. In some embodiments, the scrollable feed is responsive to swipe inputs in other directions besides vertical swiping inputs. For example, a user performing a horizontal swipe or tap may cause additional information and/or affordances related to the particular content item to be presented. For example, respective tap gestures directed to opposite sides of the particular content item may cause navigation between respective media content items of composite content item.

Figure 4C:
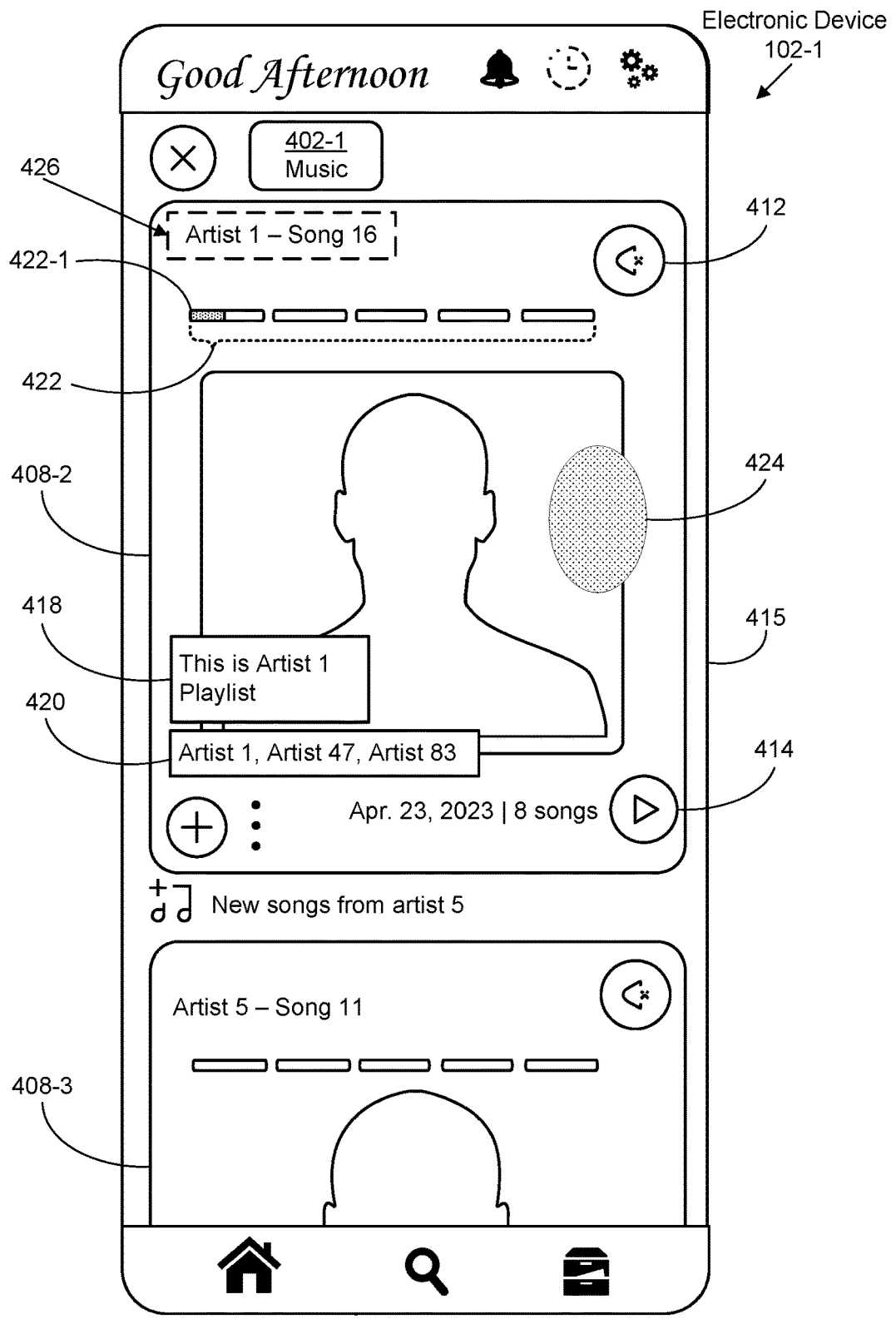

FIG. 4C illustrates the user interface 415 after the swipe input 416 causes the content items within the scrollable feed to move upward within the user interface. Based on the swipe input 416, the user interface element 408-2 (e.g., a content item) becomes in focus instead of the user interface element 408-1 shown in FIG. 4A, in accordance with some embodiments. The user interface element 408-2 (e.g., a composite content item) includes a plurality of video content items and/or representations of audio content items that are associated with a particular content item. For example, the composite content item can include a plurality of representations of audio content items, a plurality of video content items, or a combination of representations of audio content items and video content items. The particular content item may be a predefined sequence (e.g., a playlist) of media items related to a particular artist (e.g., "This is Artist 1"), in accordance with some embodiments. The user interface element 408-2 includes a plurality of indicators 422, which can be used to indicate a video content item and/or representation of an audio content item that is being played back within the user interface 415. For example, in FIG. 4C, the indicator 422-1 has a different visual appearance than the other indicators of the plurality of indicators 422, to indicate that the respective video content item and/or representation of an audio content item corresponding to the indicator 422-1 is being played back. In some embodiments, the first content item of the composite content item automatically begins playback when the user interface element 408-2 replaces the user interface element 408-1 as the in-focus user interface element. In some embodiments, audio content of the composite content item is muted by default while there is a currently-playing media content item in the listening session when the user interface element 408-2 becomes in focus.

The user interface element 408-2 includes multiple affordances for interacting with the particular content item, including the affordances 412 and 414 described with respect to FIG. 4B. For example, as shown in FIG. 4C (via a user input 424), the user interface element 408-2 itself (or a portion thereof) may generally be a selectable affordance for causing a next content item of the plurality of video content items and/or representations of audio content items to be played, which may cause skipping the remainder of the content item that is being played. Other user inputs directed to explicit affordances associated within the user interface element 408-2 may cause different operations to occur related to the particular content item and/or the content item of the plurality of video content items and/or representations of audio content items. For example, a user input directed to the affordance 412 (e.g., a mute button) toggles whether audio is provided in conjunction with visually presenting the video content item and/or representation of the audio content item that is being displayed (and/or additional content items that are played back in sequence after the displayed content item). In some embodiments, if a media item is being played back while the user is viewing a content item (e.g., there is a currently-playing media item in the listening session), such as the user interface element 408-2, a user input directed to the affordance 412 may cause the media item being played back (e.g., the currently-playing media item) to be paused in conjunction with providing audio corresponding to the video content item or representation of an audio content item that is being displayed by the user interface element 408-2. A user input directed to the affordance 414 (e.g., a play button) may cause playback of a media content item represented by a displayed content item within the user interface element 408-2 (e.g., playback of the entire media content item), as described in more detail with respect to FIG. 4E.

The user interface element 408-2 includes several user interface elements displaying information about the particular content item, including the respective content item of the plurality of video content items and/or representations of audio content items that are being presented within the user interface element 408-2. In accordance with some embodiments, one or more of the user interface elements presenting information about the particular content item are also affordances for interacting with the particular content item. For example, the user interface element 408-2 includes a user interface element 418, indicating a title and media-content type of the particular content item. And the user interface element 418 is responsive to a user input to initiate playback of the particular content item (e.g., from a first media content item of the particular content item) and/or to cause presentation of a playlist-listing user interface (e.g., the user interface 425 shown in FIG. 4G) associated with the particular content item (e.g., instead of the user interface 415 containing the scrollable feed). A user interface element 420 includes information about other artists within the particular content, which may be used to provide an indication to the user about other media content items that comprise the particular content item, but which are not represented by any of the plurality of video content items and/or representations of audio content items that are presented as part of the composite content item. In some embodiments, a first set of preview criteria may be used to determine which content items to present as part of the composite content item (e.g., new releases, trending tracks, a user's playback history, the existence of video content associated with a media content item), and a second set of preview criteria may be used to determine indications presented within the user interface element 420. In some embodiments, a user interface element presented in conjunction with a particular content item can be a playback progress indicator (e.g., indicating a point in time of a podcast that the particular content item is associated), and a user input directed to the playback progress indicator can cause the media content item to be played back from the point in time of the audio content item that is indicated by the playback progress indicator.

Figure 4D:
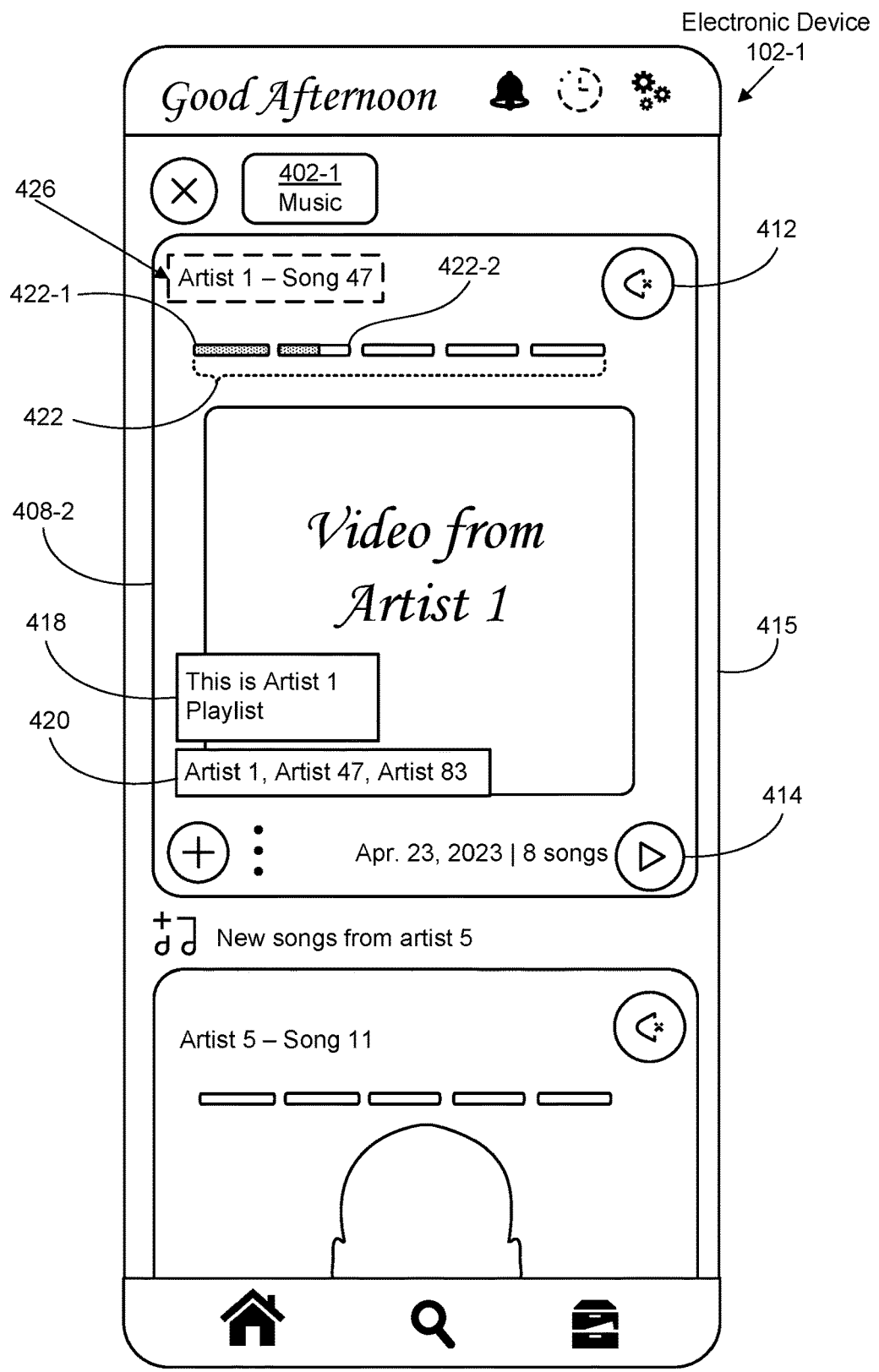

FIG. 4D illustrates the scrollable feed user interface after receiving the user input 424 directed to the user interface element 408-2 (e.g., a general affordance associated with the user interface element 408-2 that is not explicitly displayed). In response to the user input 424, a different content item (e.g., a video content item) of the plurality of video content items and/or representations of audio content items is shown within the user interface element 408-2. And an indicator 422-2 of the plurality of indicators 422, different than the indicator 422-1, has a modified visual appearance (e.g., than the other indicators corresponding to content items of the particular content item that have not been interacted with by the user). In some embodiments, the visual appearance of the indicator 422-1 is dynamically modified to indicate an amount of progress of playback that has occurred with respect to the content item corresponding to the indicator 422-2. In some embodiments, the change to the visual aspect of the indicator 422-1 persists while the next content item corresponding to the visual indicator 422-2 is being presented, to indicate the user's progress through the plurality of content items of the composite content item. That is, indicators corresponding to particular content items that have already been played back can be displayed with a different visual appearance (e.g., a different color, a different visual texture) than visual indicators corresponding particular content items that are still to be played as part of an ordered progression through the composite content item.

Figure 4E:
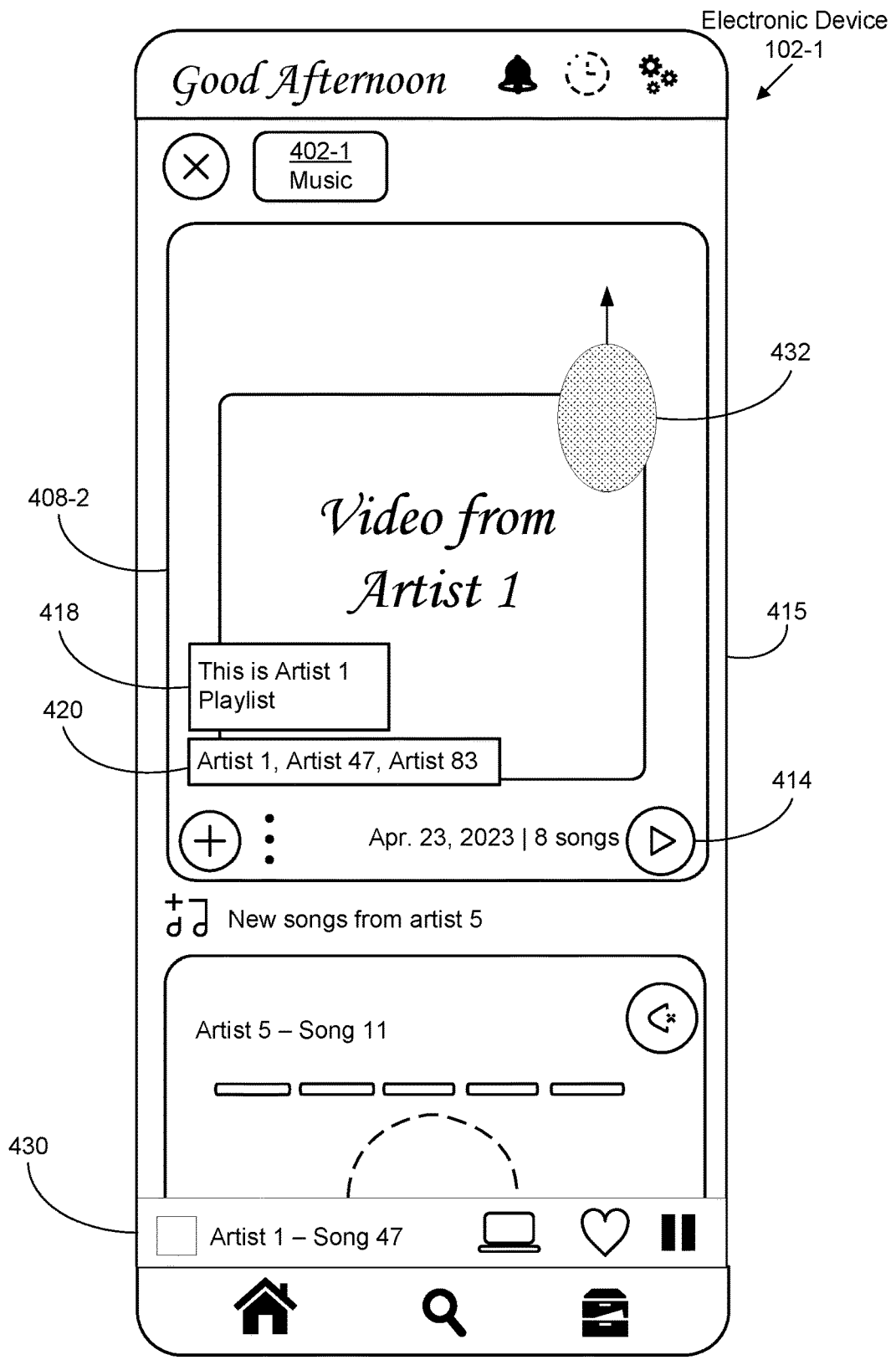

FIG. 4E shows another representation of the user interface element 408-2 after the electronic device receives a user input directed to the affordance 414 (e.g., a play button affordance). In some embodiments, in response to receiving a user input directed to the affordance 414, a media content item (e.g., a full song track) associated with the video content item and/or representation of an audio content item that is being displayed within the user interface element 408-2 (e.g., as indicated by the respective indicator of the plurality of indicators 422) begins to play while the scrollable feed remains in view. While the media item associated with the respective video content item and/or representation of the audio content is playing, an indicator 430 (e.g., a horizontal playback indicator bar element) is presented within a portion of the user interface 415. The indicator 430 includes information about the media content item while it is playing.

In accordance with some embodiments, several visual aspects of the user interface element 408-2 are modified in response to the user input to initiate playback of the media content item. For example, the plurality of indicators 422, indicating the different content items of the plurality of video content items and/or representations of audio content items, ceases to be displayed. The affordance 414 and the informational user interface elements 426 and 428 also cease to be displayed while the media content item is playing, in accordance with some embodiments. In some embodiments, dynamic sound bars are presented (e.g., next to the user interface element 418) indicating that the particular content item is playing (e.g., starting from the media content item, which may not be the first media content item in the predefined sequence that comprises the particular content item). That is, when playback of the media content item concludes, a next media item of the predefined sequence may be played back as part of playing the predefined sequence. In some embodiments where the particular content item is associated with a podcast or audiobook, playback may continue through the portion of the podcast and/or audiobook that the particular content item is associated with.

FIG. 4E also illustrates that, while the media content item is being played back, the electronic device 102-1 detects swipe input 432 within the scrollable feed user interface. In some embodiments, while there is a currently-playing media item in the listening session, any user inputs directed to affordances of the user interface element 408-2 cause the currently-playing media item to be paused (but not replaced) while the user is interacting with the composite media content item represented by the user interface element 408-2. In some embodiments, a user interaction with a particular affordance (e.g., the user interface element 412) may cause the currently-playing media item to be temporarily paused while one particular content item of the composite content item plays back (e.g., a single video content item), then the currently-playing media item may be re-initiated (e.g., ceasing to be paused) when the composite content item transitions to the next video content item and/or representation of an audio content item. In some embodiments, a currently-playing media item may cease to be the currently-playing media item based on a user selection of a content item that is associated with a media item of a different media-content type. For example, while a song is the currently-playing media item, a selection of a content item associated with a song may cause the currently-playing media item to be temporarily paused, and a user selection of a content item associated with a podcast or audiobook may cause the currently-playing song to cease being the currently-playing media item.

Figure 4F:
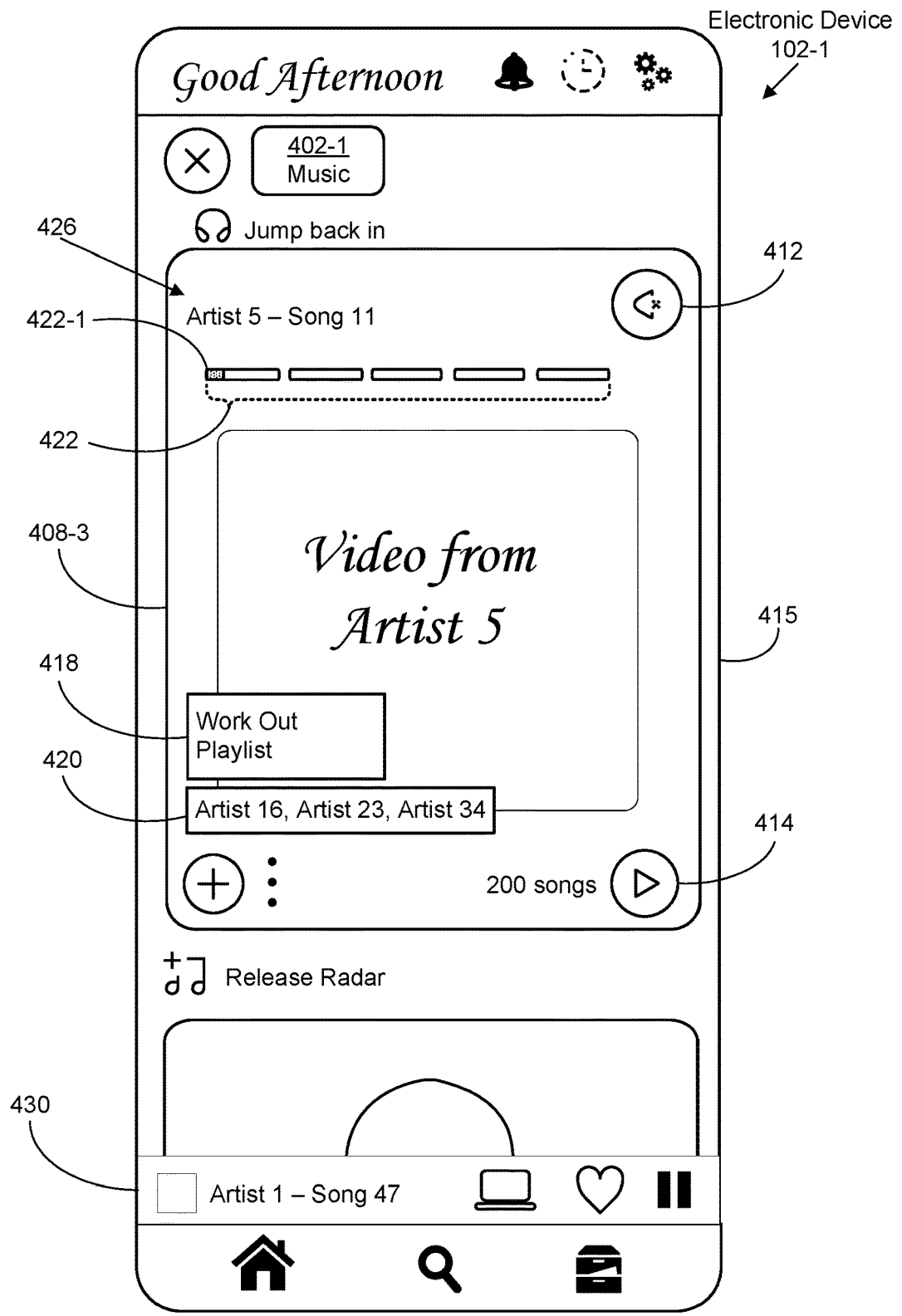

FIG. 4F shows the user interface 415 while a user interface element 408-3 is being presented within the scrollable feed user interface. The media content item that was being played back in FIG. 4E is still being played back in FIG. 4F, even though the user interface element 408-3 is in focus within the scrollable feed user interface instead of the user interface 408-2 that included representation of the media content item (e.g., as part of a composite content item). In accordance with some embodiments, instead of pausing the media content item, the video content item and/or representation of the audio content item presented within the user interface element 408-3 (e.g., the particular content item that is in focus) is automatically muted while the visual content of a particular content item is being presented. In some embodiments, while a media content item is being played, a user input directed to the affordance 412 (e.g., a mute button) causes the media content item being played back to be paused and audio content associated with the particular content item to be played in conjunction with the progress of playback of the visual content (e.g., video content and/or dynamic sound bars).

Figure 4G:
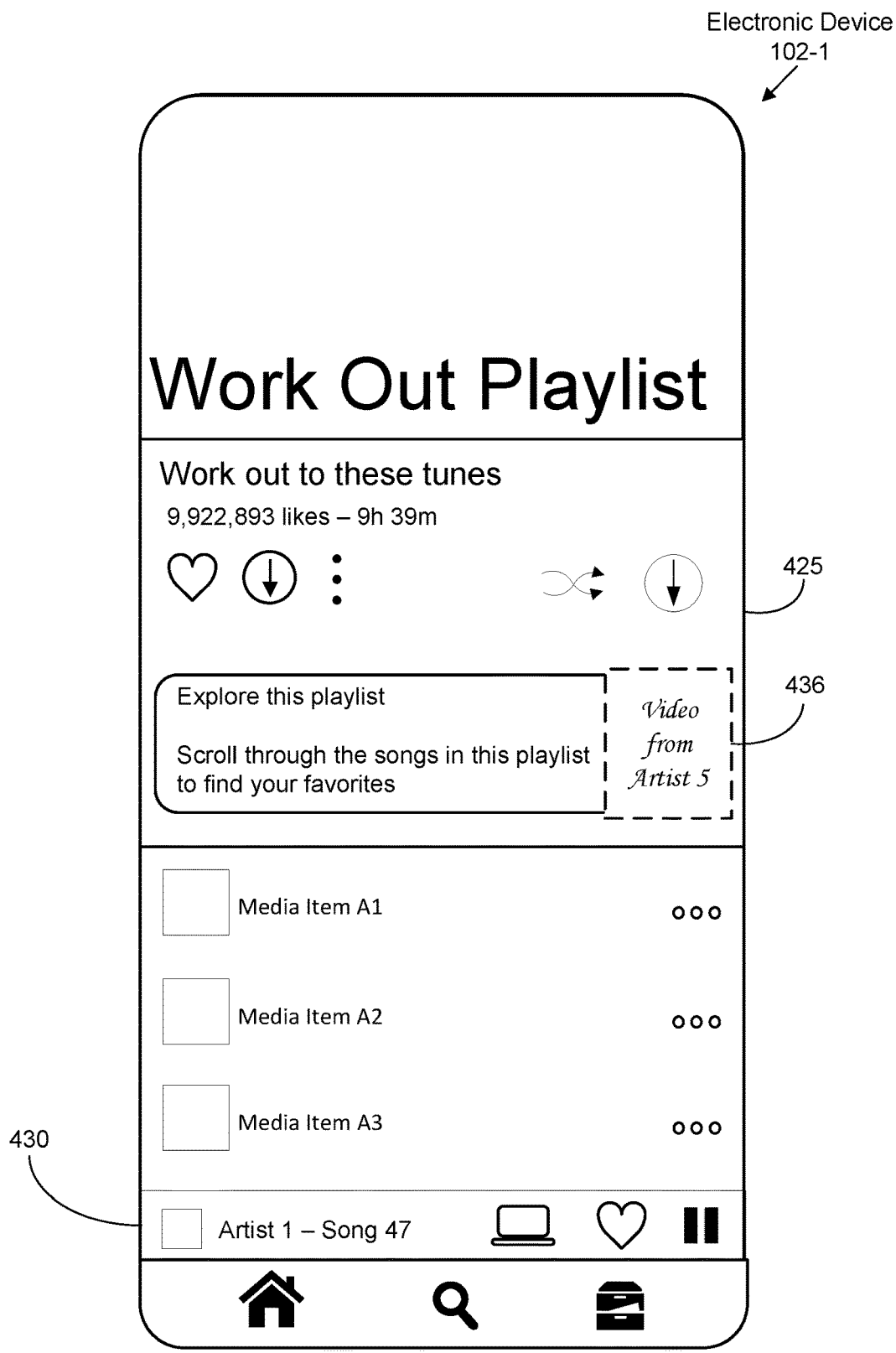

FIG. 4G shows a user interface 425 (e.g., a playlist-listing user interface) being presented based on a user input directed to the user interface element 418 corresponding to the particular content item (e.g., a playlist titled "Workout Playlist"), the user interface 425 may include additional information about the playlist represented by the particular content item (e.g., "Work out to these tunes"). For example, the playlist-listing user interface may include a continuous listing of the predefined sequence of media items comprising the particular media item (e.g., a playlisted of ordered song tracks) associated with the user interface element 408-3, additionally or alternatively to the scrollable feed of content items. In some embodiments, at least a portion of the scrollable feed and/or the composite content item may continue to be displayed while the electronic device is presenting the information from the playlist-listing user interface. For example, the user interface 425 includes a user interface element 436, that, when selected, causes video content items associated with the media content items in the playlist (e.g., the video content item shown in FIG. 4F) to be presented within the user interface 425 (e.g., or a different user interface). In some embodiments, the video content item associated with the user interface element 436 automatically plays when the user transitions to the playlist-listing user interface. In some embodiments, audio content of the video content item associated with the user interface element 436 is automatically muted while there is a currently-playing media item in the listening session. In some embodiments, when the user selects the user interface element 436, the video content items associated with the playlist are presented in a continuous scrollable feed (e.g., within the scrollable feed user interface). While the user is viewing the playlist user interface, the indicator 430 indicating that the media item is being played back (e.g., the currently-playing media item) persists as the electronic device 102-1 transitions from presenting the scrollable feed user interface to presenting the playlist-listing user interface. In some embodiments, the user can select a media item from the playlist listing within the playlist-listing user interface to cause a new media item to play back, and based on the user selection, the indicator 430 may persist within the playlist-listing user interface, indicating that the new media item is now being played back.

Figure 4H:
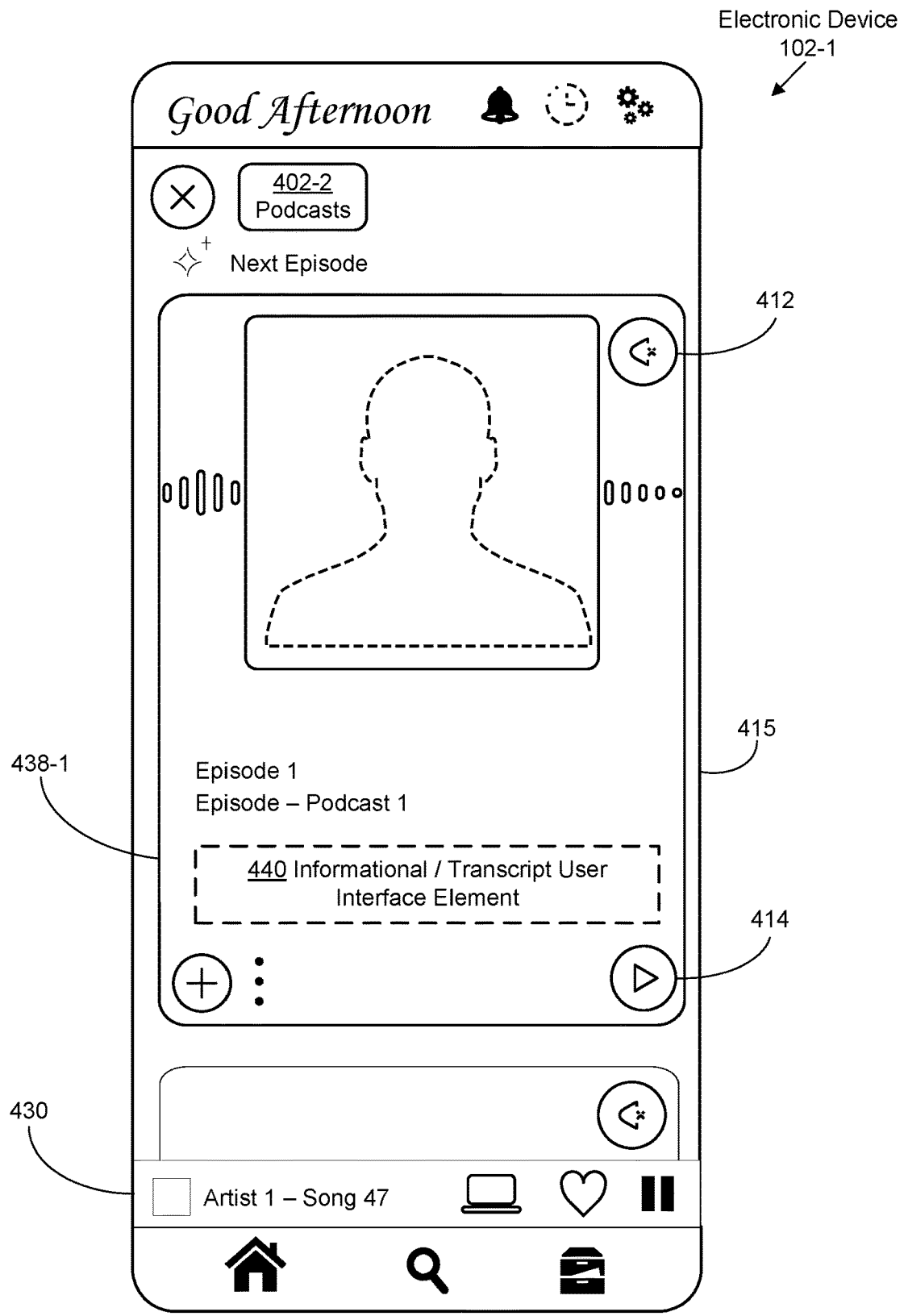

FIG. 4H shows the user interface 415 including a second scrollable feed, distinct from the scrollable feed that displayed in FIGS. 4B to 4E. The second scrollable feed is associated with a different media-content type (e.g., podcasts), in accordance with some embodiments. In some embodiments, the second scrollable feed may contain only representations of audio content items, only video content items, or a combination of video content items and representations of audio contents). In some embodiments, user inputs directed to respective affordances within the second scrollable feed can cause different operations to occur than are caused by user inputs directed to the same or similar affordances within the first scrollable feed. For example, a user input directed to the affordance 414 may cause an episode of a podcast to be played back from a particular intermediate point in time based on a point of time represented by a preview of the podcast presented with the user interface element 438-1 (e.g., as a video content item and/or a representation of an audio content item). In some embodiments, different information may be presented within content items that are associated with different media-content types. For example, the content item 438-1 includes an informational user interface element 440 that includes information about the media item represented by the user interface element 438-1, such as a transcript of the audio content in the preview (which may be visually updated as spoken words are provided as part of playback of the audio content associated with the user interface element 438-1 (e.g., as karaoke-style subtitles)).

Figure 4I:
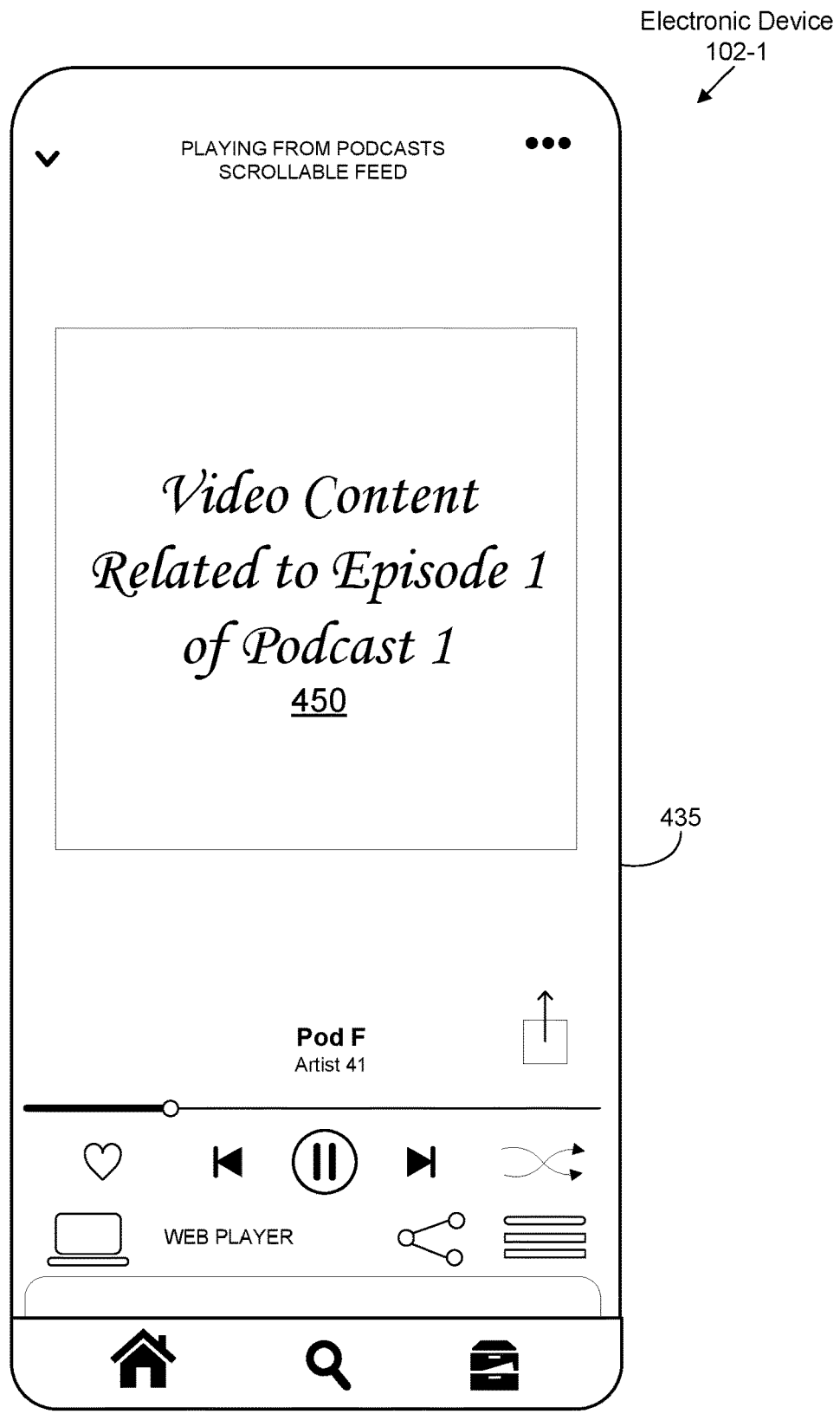

FIG. 4I shows a user interface 435 (e.g., a now-playing user interface) being displayed based on a user input to play back the media content item associated with the content item that is being presented within user interface element 438-1 in FIG. 4H (e.g., a currently-playing media item). In some embodiments, when the selects a video content item within the scrollable feed user interface (e.g., via a user input directed to the affordance 414), a representation of the video content (e.g., a video element 450) is presented within the now-playing user interface, and the video element continues to loop while the media content item is played back.

In some embodiments, the indicator 430 indicating a media content item that is being played back ceases to be presented while the now-playing user interface being presented. That is, the indicator 430 may a substitute for information that would otherwise be presented within the user interface 435, to provide information to the user about the media content item that is being played back, while the user interacts with other user interfaces. In some embodiments, user inputs provided within the now-playing user interface may be provided to a unified stream of feedback (e.g., of implicit and/or explicit feedback), which may be used to determine which content items to present to the user within one or more scrollable feeds of media items within a respective scrollable feed user interface. In some embodiments, the unified stream of feedback includes feedback about content items having a plurality of different media-content types. And likewise, implicit and/or explicit feedback provided by the user to the content items in the scrollable feed user interface may be used to determine a media content item to recommend for playback to the user from within the user interface 435.

Figure 5B:
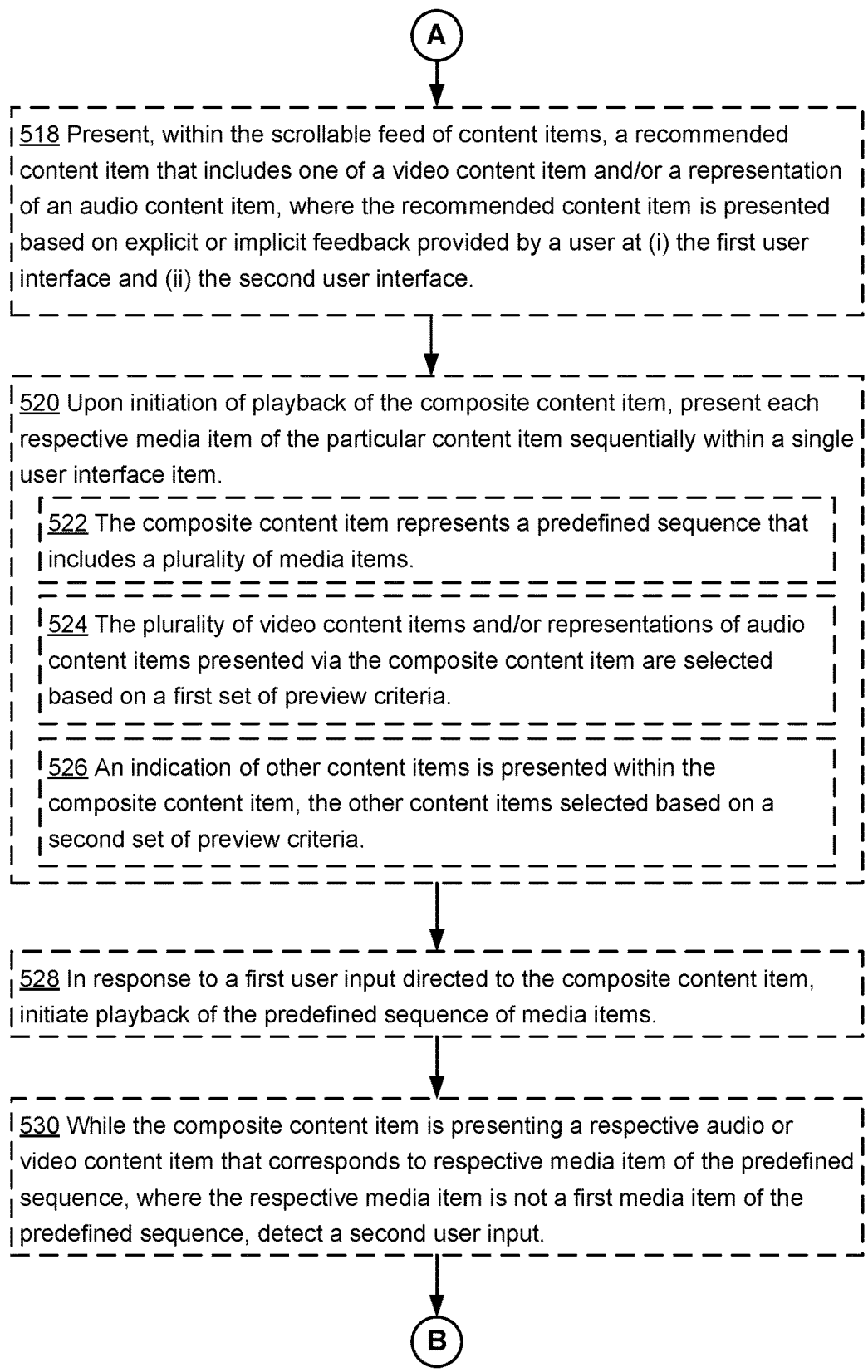

FIGS. 5A-5C are flow diagrams illustrating a method 500 of presenting user interfaces that include scrollable feeds of content items at an electronic device, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device. In some embodiments, the operations discussed with respect to FIGS. 5A and 5B can be performed without interrupting the user's listening session, by accommodating a currently-playing media item while the user is interacting with the scrollable feeds of content items described with respect to FIGS. 5A and 5B. That is, functionality (e.g., operations) of the scrollable feeds may be adaptably configured, such that a first set operations is performed while there is no currently-playing media item being played back in the user's listening session, and a second set of operations may be performed while there is a currently-playing media item being played back in the listening session. For example, as described with respect to FIGS. 4A to 4I, audio content of content items in a scrollable feed being presented to the user can be muted while there is a currently-playing media item in the listening session, and a user input directed to a mute button (e.g., affordance 112)

can cause a currently-playing media item to be paused in conjunction with enabling audio content of a content item being presented in a scrollable feed.

Referring now to FIG. 5A, in performing the method 500, the electronic device presents (502), via a first user interface of a media-providing service, a scrollable feed of content items. For example, FIG. 4B shows an example of a scrollable feed of content items of a first media-content type (e.g., music), and FIG. 4H shows another example of a scrollable feed of content items of a second media-content type (e.g., podcasts).

The scrollable feed includes (504) one or more representations (e.g., static representations and/or dynamic representations that do not included any visual content) of audio content items (e.g., tracks, albums, playlists, podcast episodes, etc.). For example, the user interface element 408-1 comprises a representation of an audio content item (e.g., Album 1). In some embodiments, the representation of the audio content item includes audio from a beginning of the particular audio content item, or a particular point in the track (e.g., the start of the chorus). For example, the preview of the respective audio content item may be a segment of the respective audio content item, which may be selected by the producer. In some embodiments, previews of audio content items do not include content from the audio content items, for example, an artist describing the track, or an artist-recorded short video associated with the track. In some embodiments, the one or more representations of the audio content items can include animation elements (e.g., dynamic sound bars) representing an aspect of the audio content item (e.g., a portion of the audio content item that is being played back as part of presenting the representation of the audio content item). In some embodiments, while audio content of a content item in the scrollable feed is muted based on a currently-playing media item in the listening session, visual aspects (e.g., user interface elements, such as the dynamic sound bars) of the content item may animate as they normally would if the audio content of the content item were being played back. In this way, the user is able to get a better sense of the media item associated with the content item in the scrollable feed even while they are listening to the audio content of the currently-playing media item.

The scrollable feed includes (506) one or more video content items associated with particular audio content items. For example, the user interface 408-3 includes video content associated with the associated audio content that it corresponds to (e.g., song 11 by artist 5). In some embodiments, the video content is a video segment that plays back on loop while the full media content item is being played back. In some embodiments, the video content of the content item in the scrollable feed is different than a video segment that plays back on loop while the full media content item is being played back (e.g., in the now-playing user interface). In some embodiments, the scrollable feed does not include any video content items, and only includes representations of audio content items (e.g., having dynamic sound bar background elements). In some embodiments, all of the media content items are video content items.

In some embodiments, the scrollable feed includes (508) a composite content item, the composite content item including a plurality of video content items and/or representations of audio content items that are associated with a particular content item (e.g., an audio track, a playlist of related audio tracks). That is, the composite content item can include a plurality of video content items, a plurality of representations of audio content items, or a combination of video content items and audio content items. For example, FIG. 4C shows a composite content item 408-2. In some embodiments, the composite content item includes a plurality of indicators (e.g., the plurality of indicators 422) corresponding to each respective audio or video content item of the plurality of audio and video content items. In some embodiments, each indicator of the plurality of indicators is configured to provide a visual indication of which respective audio or video content item is being provided to the user. In some embodiments, as content is played back within the composite content item, a progress of the playback is indicated by the respective indicator corresponding to the media content item (e.g., the video content item or representation of an audio content item) that is being played back. For example, in FIG. 4D, a portion of the indicator 422-2 includes a different visual aspect than the other indicators of the plurality of indicators 422 to show the progress of playback of the media content item corresponding to the indicator 422-2.

In some embodiments, the scrollable feed of media items is a first scrollable feed, and the video content items and the representations of audio content items within the first scrollable feed are (510) associated with media items having a first media-content type (e.g., songs, podcasts, audiobooks). In some embodiments, the user interface includes a plurality of affordances for navigating to different scrollable feeds associated with different media-content types (e.g., music, podcasts, audiobooks, etc.). For example, the user interface shown in FIG. 4A includes the user interface elements 402-1 to 402-3, which each correspond to scrollable feeds of different media-content types, which, when selected cause the corresponding scrollable feeds to be presented alternatively, and/or additionally to the user interface elements being presented in FIG. 4A. In some embodiments, while an indicator is being presented that there is a currently-playing media item in the listening session, the indicator persists while the user interface transitions between respective scrollable feeds of different media-content types. In some embodiments, when a user provides a user input to present a scrollable feed of a different media-content type than the currently-playing media item in the listening session (e.g., a user input to present a scrollable feed of spoken-word media items while a musical media item is the currently-played media item in the listening session) the currently-playing media item ceases to be played back and/or the indicator ceases to be provided within the user interface.

In some embodiments, the electronic device receives (512) an implicit or explicit user selection of a respective video content item associated with the respective particular audio content item (or an implicit or explicit user selection of a representation of an audio content item). In some embodiments, the respective video content is playing back (e.g., including playback of a preview of the associated audio content item) while the device receives the user selection. In some embodiments, the respective video content is muted by default. In some embodiments, the user selection of the respective video content comprises user selection of an affordance for playing back the audio content item associated with the respective video content item. In some embodiments, the first user interface also includes an affordance for playing back the video content item itself (e.g., a mute/unmute button that will mute/unmute in the middle of the video content time). In some embodiments, an implicit selection occurs when the device plays back the entire video content item and, in response to completion of the entire video content item, transitions to the corresponding audio content item. In some embodiments, an explicit user selection comprises a user input (e.g., a user input directed to the affordance 414 (e.g., the play button), as described with respect to FIG. 4E).

In some embodiments, in response to (514) the implicit or explicit user selection of the video content item associated with the respective particular audio content item, the electronic device plays back the respective audio content item associated with the video content item. In some embodiments, in response to (516) the implicit or explicit user selection of the respective particular video content item associated with the respective particular audio content item, the electronic device transitions to a second user interface associated with playback of particular media items (e.g., a now-playing user interface, a user interface including user inputs for controlling playback of the first media item). In some embodiments, when the electronic device transitions to the second user interface, the audio content item associated with the video content item becomes (e.g., replaces) the currently-playing media item in the listening session. In some embodiments, the user selection of the video content item includes a touch input over a first portion of the video content item (e.g., a play button superimposed over the video content item). In some embodiments, the device performs an alternate operation (e.g., transitioning to the next or previous "story") in response to a touch input over a second portion of the video content item. In some embodiments, the user selection of the media content item causes the audio content item to playback from a particular intermediate point of the audio content (e.g., a particular section of a podcast, a particular chapter of an audiobook).

In some embodiments, instead of transitioning to the second user interface, the device updates the first user interface to indicate that the respective audio content is now playing (e.g., by presenting the indicator 430 indicating that the media item associated with the content item of the composite content item was displayed when the user selected the affordance 414). In some embodiments, a user input directed to a mute button presented in conjunction with the content item causes the audio content of the content item (e.g., a preview) to play back without changing the respective audio content item that is now playing. That is, the currently-playing media item in the listening session can be paused based on a user input directed to a user interface element for muting/unmuting the audio content of the content item in the scrollable feed. For example, while the media item indicated by the indicator 430 is being played back in FIG. 4F, a user input directed to the affordance 412 (a mute button), may cause the media item to pause while the electronic device plays back audio content of the respective video content item that is being presented within the user interface element 408-3 (e.g., "Video from Artist 5"). In some embodiments, a selection of a particular content item having a different media-content type than the media-content type of the currently-playing media item causes the currently-playing media item to cease being currently playing (e.g., to provide an intuitive and smooth listening experience to a user wishing to switch to a different form of audio consumption).

In some embodiments, the first user interface includes an indicator (e.g., a status bar at the bottom of the screen, such as the indicator 430 shown in FIG. 4E to 4H), the indicator presents information about the respective audio content item that is being played back. In some embodiments, while the indicator is being presented within the first user interface, a first preview input is detected. Based on the first preview input being directed to a respective content item in the scrollable feed, while continuing to present information about the respective audio content item, the electronic device causes playback of audio content of the respective content item. That is, the audio content item that was selected for playback (e.g., at the second user interface that includes the now-playing view) may remain as the media content item that is associated with the indicator, while the audio and/or video content is being played back within the scrollable feed.

In some embodiments, while the indicator is being presented within the first user interface, a second preview input is detected. Based on the second preview input being directed to the respective content item in the scrollable feed, the electronic device plays back a second respective audio content item associated with the respective content item in the scrollable feed. For example, while the indicator 430 indicates that a first media item (e.g., Song 47 by Artist 1) is being played back, a user input directed to the affordance 414 may cause a second media item (e.g., Episode 1 of Podcast 1) to be played back (e.g., from a particular point in time of the media item that is represented by the content item being presented in FIG. 4H, as shown in FIG. 4I).

Turning now to FIG. 5B, in some embodiments, the electronic device presents (518), within the scrollable feed of content items, a recommended content item that includes one of a video content item and/or a representation of an audio content item, where the recommended content item is presented based on explicit or implicit feedback provided by a user at (i) the first user interface and (ii) the second user interface (e.g., a now-playing user interface). That is, explicit and/or implicit feedback provided by the user at either of the first and/or second user interfaces is merged into a unified stream of feedback for media items, such that the feedback can be utilized for providing recommendations and/or updating the user's preferences with respect to one or both of the first and/or second user interface. For example, a user input at the second user interface skipping or otherwise ceasing playback of the first media item may be used (e.g., as part of a determination made by a machine-learning model) to determine one or more media items to present within the scrollable feed user interface (e.g., as part of a composite content item). And likewise, user inputs directed to video content items and/or representations of audio content items presented within the scrollable feed may be used (e.g., as part of a determination made by the machine-learning model) to determine a recommended media item to initiate playback of within the now-playing user interface (e.g., the user interface shown in FIG. 4I).

In some embodiments, upon initiation (520) of playback of the composite content item, the electronic device presents each of the plurality of audio and video content items sequentially within a single user interface item (e.g., a story viewer that includes affordances indicating which of the respective content items of the plurality of content items is being played back). In some embodiments, in accordance with a user input directed to the composite media item, the method includes ceasing to present the plurality of indicators, and ceasing to sequentially present the audio and video content items (e.g., only presenting the audio or video content item corresponding to the media item that is being played back). In some embodiments, the content items of the composite items are played back without audio content (e.g., muted) while there is a currently-playing media item in the listening session.

In some embodiments, the composite content item represents (522) a predefined sequence that includes a plurality of media items (e.g., a playlist, an album, an artist radio mix, etc.). For example, the composite content item may represent a playlist that can be separately accessed and/or interacted with via a playlist-listing user interface as described with respect to FIG. 4G. In some embodiments, a composite content item may be associated with a podcast series, and/or an audiobook, and each of the respective particular content items of the composite content item may be associated with a particular episode or chapter of a collection of content items.

In some embodiments, the plurality of video content items and/or representations of audio content items presented via the composite content item are selected (524) based on a first set of preview criteria (e.g., a release data, availability to present video content, a trending nature of a particular media item and/or artist). For example, a first determination may be made that a subset of the media content items associated with the composite content item do not include associated video content, and may thus be less likely to be presented within the composite content item. A second determination may be made that a subset of the media content items are new releases, and may thus be more likely to be represented within the composite content item. In this way, the method 500 causes the electronic device to provide the user with a more interactive browsing experience (e.g., that maximizes the amount of visual content being presented to the user) even while the user is listening to the currently-playing media item in the listening session.

In some embodiments, an indication of other content items is presented within the composite content item, the other content items selected (526) based on a second set of preview criteria (e.g., the user's listening history, follower count of the artist associated with the respective other content item). That is, the information can identify additional artists that are associated with the playlist that are not included in the sequence of video content items and/or representations of audio content items. In some embodiments, the indication is provided within the composite content item (e.g., in the user interface element 420 in FIG. 4C). In some embodiments, an additional visual indication can be provided indicating that one of the artists selected based on the second set of preview criteria is the producer (or a featured artist) of the currently-playing media item in the listening session.

In some embodiments, in response to a first user input directed to the composite content item, the electronic device initiates (528) playback of the predefined sequence of media items. For example, in accordance with the playlist user interface being presented in FIG. 4G, a playlist associated with the particular content item 408-3 may be played from the beginning (e.g., from a first media item in the predefined sequence).

In some embodiments, while the composite content item is presenting a respective audio or video content item that corresponds to respective media item of the predefined sequence, where the respective media item is not a first media item of the predefined sequence, the electronic device detects (530) a second user input (e.g., a user input directed to the affordance 414).

Turning now to FIG. 5C, in some embodiments, in accordance with determining that the second user input is directed to a first affordance corresponding to the respective media item (e.g., a track identifier), the electronic device initiates (532) playback of the predefined sequence from the respective media item. For example, as described with respect to FIG. 4E, the electronic device begins playing back the predefined sequence of media items corresponding to the user interface element 408-2 from the media item associated with the content item that was being presented when the user input directed to the affordance 414 was detected.

In some embodiments, in accordance with determining that the second user input is directed to a second affordance corresponding to the predefined sequence (e.g., a selectable playlist identifier), the electronic device performs (534) an alternate operation related to the predefined sequence, distinct from initiating playback of the predefined sequence from the respective media item (e.g., initiating playback from a beginning media item, distinct from the respective media item, of the predefined sequence). In some embodiments, if a user provides a user input to a content item in a scrollable feed associated with media items of a different media-content type than the media-content type of the currently-playing media item in the listening session, the media item may cease to be the currently-playing media item in the listening session. That is, the method 500 provides an intuitive experience by ceasing to play media items of a different media-content type than the media items that the user is currently browsing. In some embodiments, when the electronic device transitions to presenting the scrollable feed of the different media-content type, the media item that ceases to be the currently-playing media item is stored, and when the electronic device transitions back to a user interface associated with the media-content type of the stored media item, the stored media item resumes playback as the currently-playing media item in the listening session.

In some embodiments, in accordance with a first determination that the second user input is directed to the first affordance corresponding to the respective media item (e.g., a track identifier), the electronic device provides (536) first feedback to a media-content server (e.g., the media-content server 104). In some embodiments, for particular media-content types (e.g., podcasts and audiobooks), feedback related to a content item may indicate one or more portions of the content item that the feedback is directed to (e.g., a portion of a podcast associated with a particular speaker).

In some embodiments, in accordance with a second determination that the second user input is directed to the second affordance corresponding to the predefined sequence (e.g., a selectable playlist identifier), the electronic device provides (538) second feedback to the media-content server corresponding to the predefined sequence. That is, distinct feedback can be provided regarding a user's listening preferences based on whether they select playback of the predefined sequence, or the individual media item.

In some embodiments, in accordance with detecting (540) a third user input directed to an affordance within the first user interface, present a second scrollable feed (e.g., within the same first user interface or a different user interface) that includes video and content items associated media items having a second media-content type (e.g., podcasts, audiobooks, and/or other spoken-word audio content). In some embodiments, the first and second scrollable feeds include respective affordances for interacting with each of the content items within each of the first and second scrollable feeds.

In some embodiments, in accordance with detecting (542) a fourth user input directed to a first respective content item within the first scrollable feed (e.g., a video or content item), the electronic device performs a first operation with respect to the first respective content item within the first scrollable feed (e.g., initiating playback of a media item of a predefined sequence of a plurality of media items (e.g., a playlist)).

In some embodiments, in accordance with detecting a fifth user input directed to a second respective content item within the second scrollable feed, the electronic device performs (544) a second operation, different from the first operation, with respect to the second respective content item within the second scrollable feed, the electronic device performs a second operation, different from the first operation, with respect to the second respective content item within the second scrollable feed (e.g., initiating playback, from a point corresponding to the respective video or content item, a spoken-word media item (e.g., the portion of a podcast that the preview is from)). In some embodiments, in accordance with detecting a third user input directed to a respective video or audio content item within a third scrollable feed (e.g., a scrollable feed of content items, each associated with respective audiobooks), the method includes performing a third operation, different from the first and second operations, with respect to the respective video content item within the third scrollable feed (e.g., presenting another user interface for purchasing a spoken-word media item (e.g., an audiobook) corresponding to the respective video and/or audio content item. That is, particular content items of different media-content types may have different responses to similar user inputs (e.g., user selection of a playback button and/or a mute button). In some embodiments, user inputs corresponding to a same relative location of the user interface presenting the particular content items (e.g., a button in the lower right corner of the content item) can have different visual appearances based on the operations that are caused to be performed by user selection (e.g., a button in a corresponding location of a play button can include a lock symbol to indicate that the user needs to purchase rights to the associated audio content item in order to access it).

In some embodiments, in accordance with a determination that an audio content item has an associated video content item, the electronic device displays (and plays back) the associated video content item in the scrollable feed (e.g., with first visual characteristics). For example, the user interface element plays back video content corresponding to the media item associated with the content item represented by the indicator 422-1, based on a determination that the media item is associated with the video content (e.g., "Video from Artist 5"). In some embodiments, while there is a currently-playing media item in the listening session, visual aspects of the video content are played back while audio aspects of the video content are muted.

In some embodiments, in accordance with a determination that the audio content item does not have an associated video content item, displaying (and playing back) the representation of the audio content item in the scrollable feed (e.g., with second visual characteristics (e.g., a particular background element (e.g., dynamic sound wave bars which may correspond to the content of the audio track)). In some embodiments, a scrollable feed may be configured to only display representations of audio content items, and foregoes displaying video content items, even if one or more particular content items have associated video content (e.g., as part of a distraction-free playback mode (e.g., for use while driving)).

In some embodiments, when the user selects the content item in the scrollable feed to initiate playback of the audio content item in the scrollable feed, the visual aspects of the content item (e.g., the dynamic soundbars, the mute button, and/or visual indicators of different content items in a composite content item are adjusted). For example, based on a user selecting to initiate playback of an audio content item associated with a content item in the scrollable feed, a mute button associated with the content item may be displayed differently such that the mute button is presented in conjunction with a miniature version of the dynamic sound wave bars, or some other fallback animation corresponding to the respective content item (e.g., playback is a preview).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
presenting, via a first user interface of a media-providing service, a scrollable feed of content items, including:
one or more representations of audio content items;
one or more video content items, each associated with a particular audio content item; and
one or more composite content items, the one or more composite content items each including a corresponding plurality of content items, each of the corresponding plurality of content items comprising video and/or a representation of audio;
displaying, in the scrollable feed, a respective audio content item and presenting the respective audio content item without corresponding video;
while displaying, in the scrollable feed, the respective audio content item, receiving a first swipe input to navigate to a different content item;
in response to the first swipe input, displaying, in the scrollable feed, the different content item, the different content item being one of a composite content item or a video content item;
upon displaying the different content item, presenting content associated with the different content item, including:
when the different content item is a respective composite content item, presenting respective ones of the corresponding plurality of content items; and
when the different content item is a respective video content item, presenting the respective video content item concurrently with an associated audio content item;
receiving an implicit or explicit user selection of the different content item; and
in response to the implicit or explicit user selection of the different content item, transitioning to a second user interface and playing back the different content item, wherein the second user interface is a currently-playing view for a listening session.

2. The method of claim 1, wherein the second user interface is associated with playback of particular media items.

3. The method of claim 1, wherein the first user interface includes an indicator, the indicator presenting information about the different content item, and the method further comprises:
- based on a first preview input directed to a respective content item in the scrollable feed:
  - while continuing to present the information about the different content item, causing playback of audio content of the respective content item; and
- based on a second preview input directed to the respective content item in the scrollable feed, playing back a second respective audio content item associated with the respective content item in the scrollable feed.

4. The method of claim 1, further comprising:
presenting, within the scrollable feed of content items, a recommended content item, wherein the recommended content item is presented based on explicit or implicit feedback provided at (i) the first user interface and (ii) the second user interface.

5. The method of claim 1, further comprising:
when the different content item is the respective composite content item, upon initiation of presentation of the respective composite content item, presenting each of the corresponding plurality of content items sequentially within a single user interface item.

6. The method of claim 5, wherein the respective composite content item represents a predefined sequence of content items, and the method further comprises:
in response to a first user input directed to the respective composite content item, initiating playback, at the second user interface, of the predefined sequence of content items.

7. The method of claim 6, further comprising:
while presenting a respective content item of the respective composite content item, wherein the respective content item is not the initial content item of the predefined sequence:
- detecting a second user input;
- in accordance with a determination that the second user input is directed to a first affordance corresponding to the respective content item, initiating playback of the predefined sequence starting from the respective content item; and
- in accordance with a determination that the second user input is directed to a second affordance corresponding to the predefined sequence, performing an alternate operation related to the predefined sequence, distinct from initiating playback of the predefined sequence starting from the respective content item.

8. The method of claim 7, further comprising:
- in accordance with a determination that the second user input is directed to the first affordance corresponding to the respective content item, providing first feedback to a media content server corresponding to the respective content item; and
- in accordance with a determination that the second user input is directed to the second affordance corresponding to the predefined sequence, providing second feedback to the media content server corresponding to the predefined sequence.

9. The method of claim 5, wherein:
when the different content item is the respective composite content item, the respective ones of the corresponding plurality of content items that are presented in the first user interface are selected based on a first set of preview criteria, and an indication of other content items is presented within the respective composite content item, the other content items included in the indication selected based on a second set of preview criteria.

10. The method of claim 1, further comprising:
- in accordance with a determination that an audio content item has an associated video content item, displaying the associated video content item in the scrollable feed; and
- in accordance with a determination that the audio content item does not have an associated video content item, displaying the representation of the audio content item in the scrollable feed.

11. The method of claim 1, wherein the scrollable feed of content items is a first scrollable feed, and the video content items and the representations of audio content items within the first scrollable feed are associated with content items having a first media-content type, and the method further comprises:
in accordance with a third user input directed to an affordance within the first user interface, presenting, via the first user interface, a second scrollable feed that includes video and content items associated with content items having a second media-content type.

12. The method of claim 11, wherein the first and second scrollable feeds include respective affordances for interacting with each of the content items within each of the first and second scrollable feeds, and the method further comprises:
- in accordance with detecting a fourth user input directed to a first respective content item within the first scrollable feed, performing a first operation with respect to the first respective content item within the first scrollable feed; and
- in accordance with detecting a fifth user input directed to a second respective content item within the second scrollable feed, performing a second operation, different from the first operation, with respect to the second respective content item within the second scrollable feed.

13. A computer system, comprising:
one or more processors; and
memory storing one or more programs, the one or more programs including a set of instructions for performing operations, comprising:
- presenting, via a first user interface of a media-providing service, a scrollable feed of content items, including:
  - one or more representations of audio content items;
  - one or more video content items, each associated with a particular audio content item; and
  - one or more composite content items, the one or more composite content items each including a corresponding plurality of content items, each of the corresponding plurality of content items comprising video and/or a representation of audio;
- displaying, in the scrollable feed, a respective audio content item and presenting the respective audio content item without corresponding video;
- while displaying, in the scrollable feed, the respective audio content item, receiving a first swipe input to navigate to a different content item;
- in response to the first swipe input, displaying, in the scrollable feed, the different content item, the different content item being one of a composite content item or a video content item;

upon displaying the different content item, presenting content associated with the different content item, including:
when the different content item is a respective composite content item, presenting respective ones of the corresponding plurality of content items; and
when the different content item is a respective video content item, presenting the respective video content item concurrently with an associated audio content item;
receiving an implicit or explicit user selection of the different content item; and
in response to the implicit or explicit user selection of the different content item, transitioning to a second user interface and playing back the different content item, wherein the second user interface is a currently-playing view for a listening session.

14. The computer system of claim 13, wherein the second user interface is associated with playback of particular media items.

15. The computer system of claim 13, wherein the first user interface includes an indicator, the indicator presenting information about the different content item, and the set of operations further comprises:
based on a first preview input directed to a respective content item in the scrollable feed:
while continuing to present the information about the different content item, causing playback of audio content of the respective content item; and
based on a second preview input directed to the respective content item in the scrollable feed, playing back a second respective audio content item associated with the respective content item in the scrollable feed.

16. The computer system of claim 13, wherein the set of operations further comprises:
presenting, within the scrollable feed of content items, a recommended content item, wherein the recommended content item is presented based on explicit or implicit feedback provided at (i) the first user interface and (ii) the second user interface.

17. The computer system of claim 13, wherein:
the set of operations further comprising:
when the different content item is the respective composite content item, upon initiation of presentation of the respective composite content item, presenting each of the corresponding plurality of content items sequentially within a single user interface item.

18. The computer system of claim 17, wherein:
the respective composite content item represents a predefined sequence of content items, and the set of instructions further comprises:
in response to a first user input directed to the respective composite content item, initiating playback, at the second user interface, of the predefined sequence of content items.

19. The computer system of claim 18, wherein the set of operations further comprises:
while presenting a respective content item of the respective composite content item, wherein the respective content item is not the initial content item of the predefined sequence:
detecting a second user input;
in accordance with a determination that the second user input is directed to a first affordance corresponding to the respective content item, initiating playback of the predefined sequence starting from the respective content item; and
in accordance with a determination that the second user input is directed to a second affordance corresponding to the predefined sequence, performing an alternate operation related to the predefined sequence, distinct from initiating playback of the predefined sequence starting from the respective content item.

20. A non-transitory computer readable storage medium storing one or more programs, the one or more programs including a set of instructions for performing a set of operations, comprising:
presenting, via a first user interface of a media-providing service, a scrollable feed of content items, including:
one or more representations of audio content items;
one or more video content items, each associated with a particular audio content item; and
one or more composite content items, the one or more composite content items each including a corresponding plurality of content items, each of the corresponding plurality of content items comprising video and/or a representation of audio;
displaying, in the scrollable feed, a respective audio content item and presenting the respective audio content item without corresponding video;
while displaying, in the scrollable feed, the respective audio content item, receiving a first swipe input to navigate to a different content item;
in response to the first swipe input, displaying, in the scrollable feed, the different content item, the different content item being one of a composite content item or a video content item;
upon displaying the different content item, presenting content associated with the different content item, including:
when the different content item is a respective composite content item, presenting respective ones of the corresponding plurality of content items; and
when the different content item is a respective video content item, presenting the respective video content item concurrently with an associated audio content item;
receiving an implicit or explicit user selection of the different content item; and
in response to the implicit or explicit user selection of the different content item, transitioning to a second user interface and playing back the different content item, wherein the second user interface is a currently-playing view for a listening session.

* * * * *